(12) United States Patent
Chien et al.

(10) Patent No.: US 8,646,812 B2
(45) Date of Patent: Feb. 11, 2014

(54) CONNECTOR ASSEMBLY

(75) Inventors: Yu-Yi Chien, New Taipei (TW);
Min-Fang Wu, New Taipei (TW)

(73) Assignee: Apex Medical Corp., New Taipei (TW)

( * ) Notice: Subject to any disclaimer, the term of this patent is extended or adjusted under 35 U.S.C. 154(b) by 304 days.

(21) Appl. No.: 13/082,498

(22) Filed: Apr. 8, 2011

(65) Prior Publication Data

US 2012/0256411 A1    Oct. 11, 2012

(51) Int. Cl.
*F16L 37/248* (2006.01)

(52) U.S. Cl.
USPC ............ 285/361; 285/376; 285/402; 403/348

(58) Field of Classification Search
USPC .......... 285/360, 361, 376, 401, 402; 403/348, 403/349
See application file for complete search history.

(56) References Cited

U.S. PATENT DOCUMENTS

| | | | | |
|---|---|---|---|---|
| 941,990 A | * | 11/1909 | Hickey | 285/88 |
| 1,033,187 A | * | 7/1912 | Metzger | 285/87 |
| 1,514,314 A | * | 11/1924 | Douglas | 439/672 |
| 3,455,580 A | * | 7/1969 | Howard | 285/87 |
| 4,072,385 A | * | 2/1978 | Wallner | 439/335 |
| 4,464,001 A | * | 8/1984 | Collins | 439/318 |
| 4,531,802 A | * | 7/1985 | Tomsa | 439/314 |
| 4,542,952 A | * | 9/1985 | Tomsa | 439/318 |
| 5,397,196 A | * | 3/1995 | Boiret et al. | 403/348 |
| 5,727,739 A | * | 3/1998 | Hamilton | 239/600 |
| 5,741,084 A | * | 4/1998 | Del Rio et al. | 403/349 |

* cited by examiner

*Primary Examiner* — James Hewitt
(74) *Attorney, Agent, or Firm* — Alan Kamrath; Kamrath IP Lawfirm, P.A.

(57) ABSTRACT

A connector assembly has a hollow first connector and a hollow second connector. The first connector has an engaging block. The second connector has an opened connecting end, a guiding groove, a resilient tab cavity, an escaping segment and a resilient tab. The resilient tab cavity is defined in the second connector at a side of the guiding groove opposite to the connecting end and communicates with the guiding groove. The escaping segment is formed on and protrudes from an outer surface of the second connector at a position between the guiding groove and the connecting end of the second connector and is hollow to define an escaping space communicating with the guiding groove. The resilient tab is formed on and protrudes from an inner surface of the resilient tab space and has a free end extending into the guiding groove.

15 Claims, 21 Drawing Sheets

CONNECTOR ASSEMBLY

BACKGROUND OF THE INVENTION

1. Field of the Invention

The present invention relates to a connector assembly and, more particularly, to a connector assembly having two connectors easily and conveniently combined with each other.

2. Description of Related Art

A connector is a necessary part for inflating an inflatable object, such as an air cushion mattress, an inflating pool or an inflatable boat, such that pressured air can be pumped into the inflatable object via the connector.

The connector for an inflatable object is a tube made of rubber and has a first end mounted in the inflatable object and a second end provided with a plug. A check valve disk made of rubber is mounted in the connector to keep pressured air from leaking. In inflating, an inserting head connected to a pressured air source is inserted into the second end of the connector and pushes against the check valve disk to allow the pressured air to be led into the inflatable object via the connector. However, the rubber conventional connector may become loosened or broken after a period of use, such that the user has to hold the inserting head and the connector with hands to prevent the inserting head from detaching from the connector. This is inconvenient in use, and the conventional connector has to be improved.

To solve the aforementioned problem of the conventional connector, another conventional connector comprising a male connecting member, a female connecting member and a clamping member is provided. The male connecting member has a clamping recess defined in one end of the male connecting member. The female connecting member has a hole corresponding to the clamping recess in the male connecting member. The clamping member has a clamping block mounted through the hole in the female connecting member and engaging the clamping recess in the male connecting member, such that the connecting members are securely combined with each other. Accordingly, manually holding the connector during the inflating process is unnecessary, and the use of the conventional connector is more convenient than the rubber conventional one. However, since the conventional connector is implemented as three individual parts, the cost for manufacturing the conventional connector is high. Furthermore, the clamping member of the conventional connector is easily lost, so that the male and female connecting members cannot combine securely with each other. Therefore, the conventional connector still has to be further improved.

To overcome the shortcomings, the present invention provides a connector assembly to mitigate or obviate the aforementioned problems.

SUMMARY OF THE INVENTION

The main objective of the invention is to provide a connector assembly to be assembled easily and conveniently.

The connector assembly has a first connector and a second connector. The first connector is hollow and has an opened connecting end and an engaging block formed on an outer surface of the first connector near the connecting end. The second connector is hollow, is detachably connected with the first connector and has an opened connecting end, a guiding groove, a resilient tab cavity, an escaping segment and a resilient tab. The opened connecting end corresponds to the connecting end of the first connector. The guiding groove is defined in the second connector. The resilient tab cavity is defined in the second connector at a side of the guiding groove opposite to the connecting end of the second connector and communicates with the guiding groove. The escaping segment is formed on and protrudes from an outer surface of the second connector at a position between the guiding groove and the connecting end of the second connector and is hollow to define an escaping space in the escaping segment and communicating with the guiding groove. The resilient tab is formed on and protrudes from an inner surface of the resilient tab space and has a free end extending into the guiding groove.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
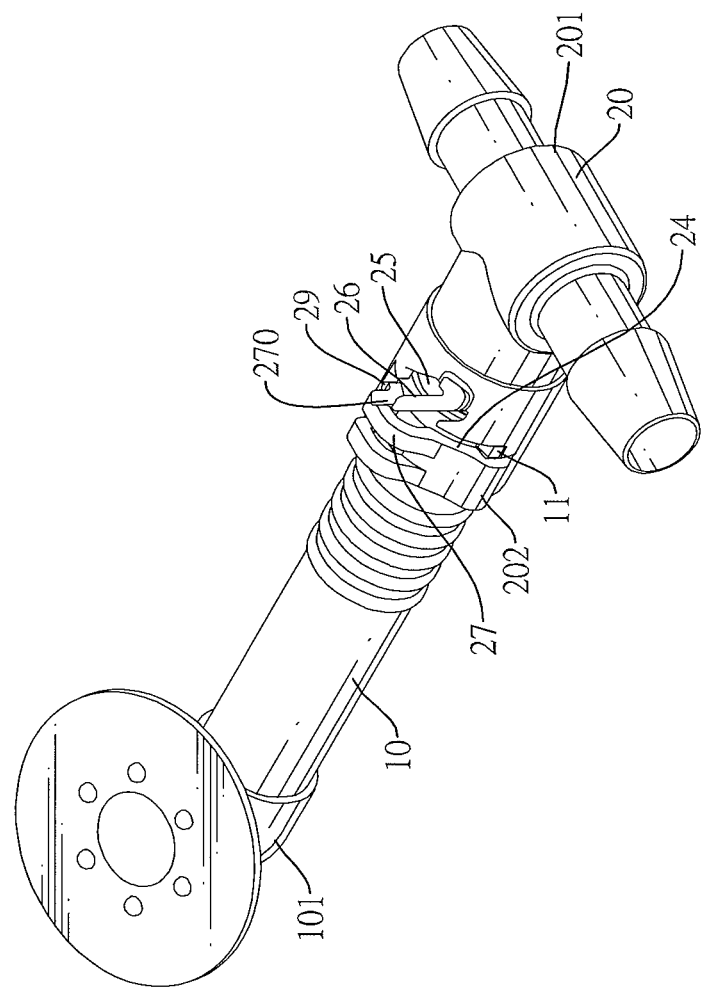
FIG. 1 is a perspective view of a first embodiment of a connector assembly in accordance with the present invention.
Figure 2:
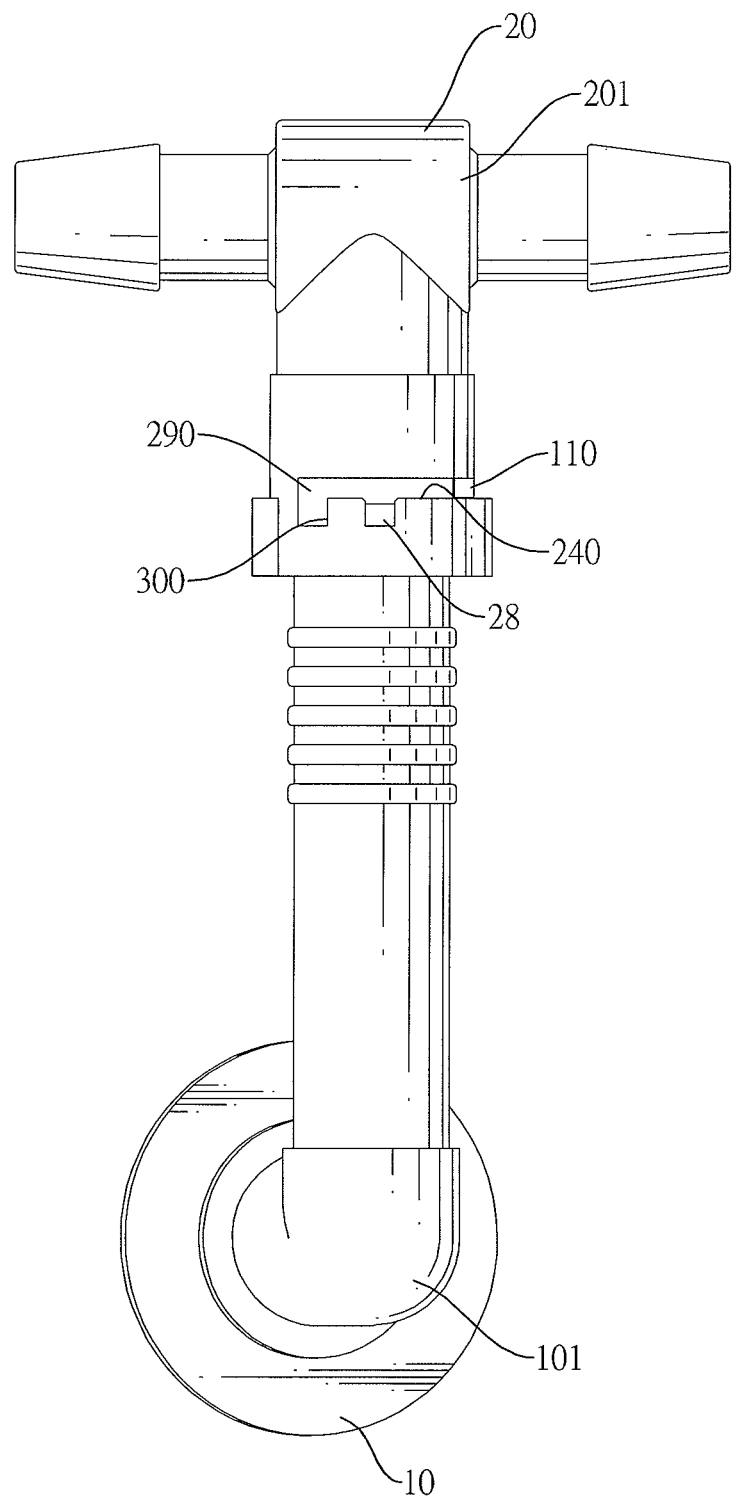
FIG. 2 is a side view of the connector assembly in FIG. 1.
Figure 3:
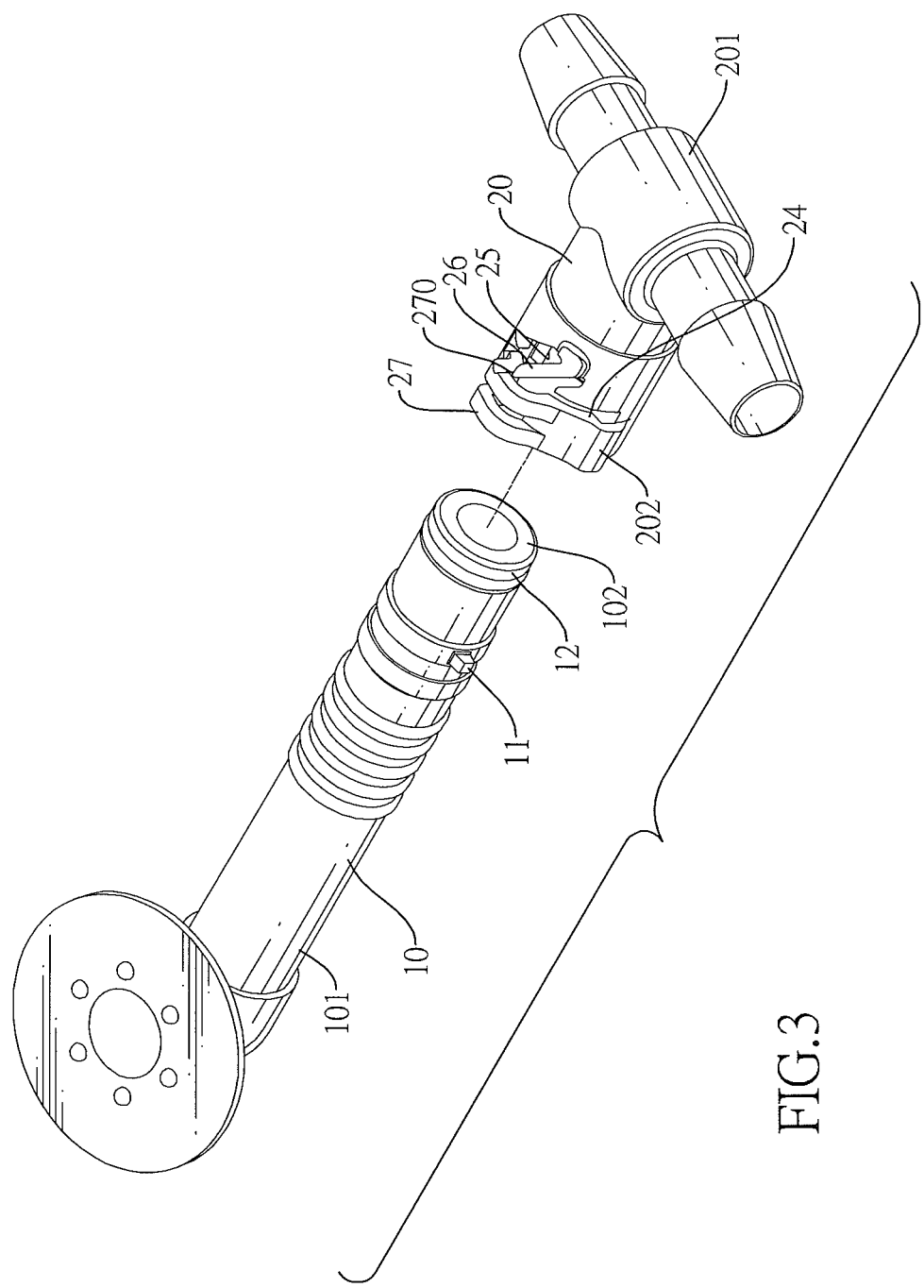
FIG. 3 is an exploded perspective view of the connector assembly in FIG. 1.

With reference to FIGS. 1 to 4, a connector assembly in accordance with the present invention comprises a first connector 10 and a second connector 20.

The first connector 10 is hollow and tubular and has an opened outer end 101, an opened connecting end 102 and an engaging block 11 formed on an outer surface of the first connector 10 near the connecting end 102. Preferably, with reference to FIG. 6, the first connector 10 further has an auxiliary engaging block 110 formed on the outer surface of the first connector 10 and diametrically opposite to and symmetric to the engaging block 11. In addition, an O-ring 12 is mounted around the connecting end 102 of the first connector 10 and is made of a resilient material, such as rubber.

Figure 6:
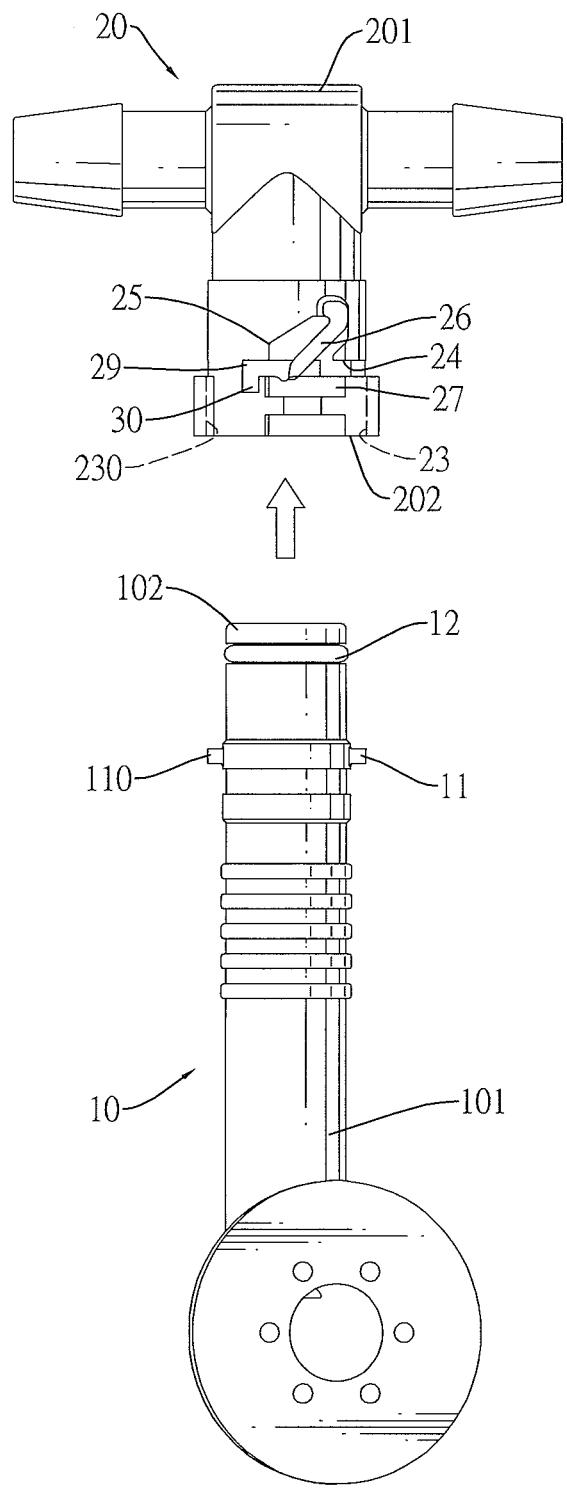
FIGS. 6 to 11 are operational side views of the connector assembly in FIG. 1 showing the combining process of the first and second connectors.

The second connector 20 is hollow and tubular, is detachably connected with the first connector 10 and has an outer end 201, an opened connecting end 202, an entrance groove 23, a guiding groove 24, a resilient tab cavity 25, an escaping segment 27 and a resilient tab 26. The connecting end 202 of the second connector 20 corresponds to and is detachably connected with the connecting end 102 of the first connector 10. The entrance groove 23 is longitudinally defined in the inner surface from the connecting end 202 of the second connector 20. The guiding groove 24 is defined in the second connector 20 and communicates with the entrance groove 23. Preferably, the guiding groove 24 is substantially perpendicular to the entrance groove 23. With further reference to FIG. 6, the end of the guiding groove 24 opposite to the entrance groove 23 is defined as a securing segment 29, and a positioning recess 30 is defined in the securing segment 29 and extends toward the connecting end 202 of the second connector 20. In addition, an auxiliary guiding groove 240 is defined in the second connector 20 and is diametrically opposite to and symmetric to the guiding groove 24. An auxiliary positioning recess 300 is defined in the securing segment 290 of the auxiliary guiding groove 240 and extends toward the connecting end 202 of the second connector 20. Two entrance grooves 23,230 may be implemented, are longitudinally defined in the inner surface from the connecting end 202 of the second connector 20, are diametrically opposite and symmetric to each other and respectively communicate with the guiding groove 24 and the auxiliary guiding groove 240.

The resilient tab cavity 25 is defined in the second connector 20 at a side of the guiding groove 24 opposite to the connecting end 202 of the second connector 20 and communicates with the guiding groove 24. The escaping segment 27 is formed on and protrudes from the outer surface of the second connector 20 at a position between the guiding groove 24 and the connecting end 202 of the second connector 20, may be U-shaped and is hollow to define an escaping space 270 in the escaping segment 27 and communicating with the guiding groove 24. The resilient tab 26 is formed on and protrudes from the inner surface of the resilient tab space 25 and has a free end extending into the guiding groove 24. The free end of the resilient tab 26 may further extend into the escaping space 270 in the escaping segment 27.

Furthermore, an auxiliary escaping segment may be further provided, is formed on and protrudes from the outer surface of the second connector 20 at a position, is diametrically opposite to and symmetric to the escaping segment 27 and is hollow to define an auxiliary escaping space 28 in the auxiliary escaping segment and communicating with the auxiliary guiding groove 240.

Figure 4:
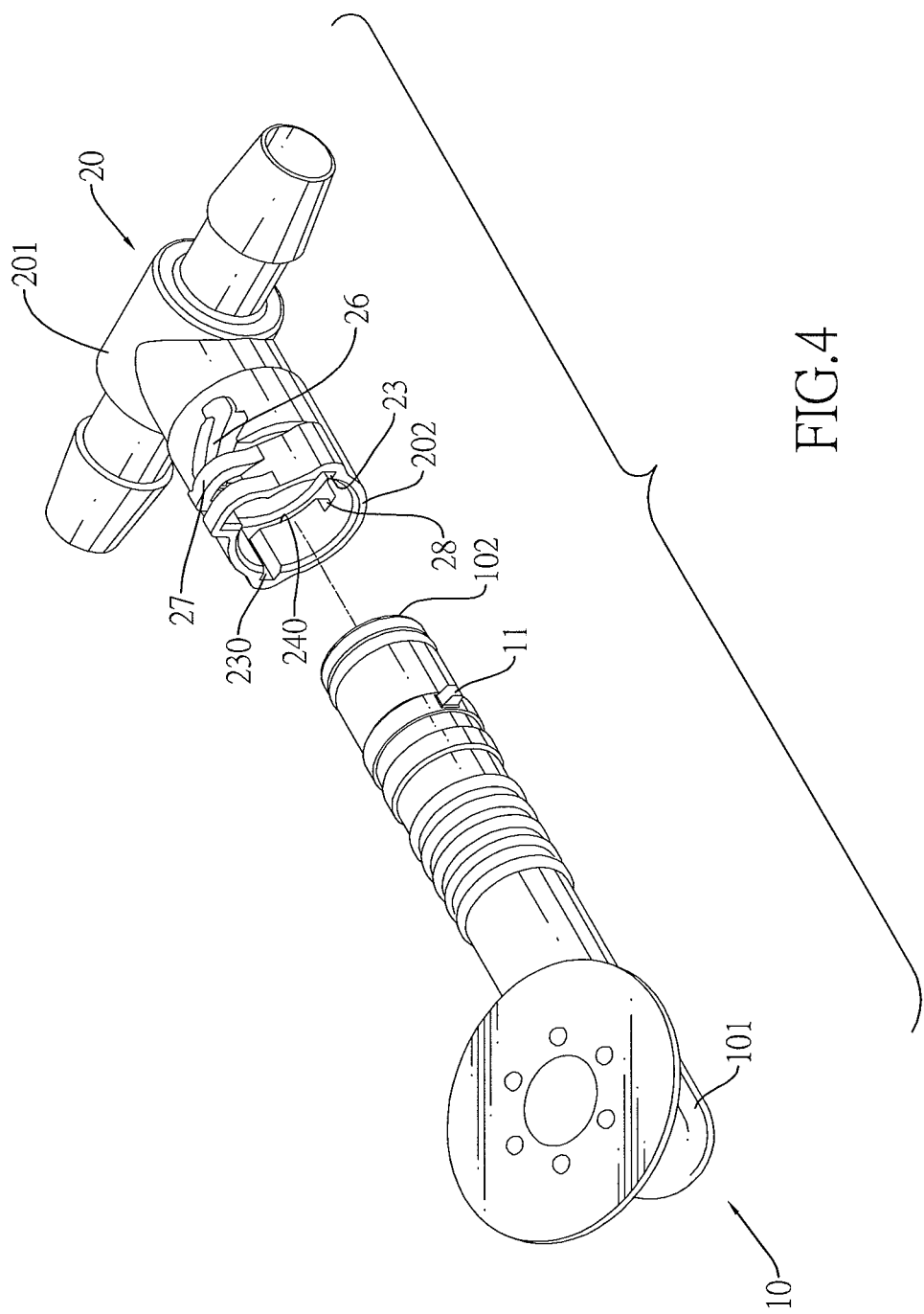
FIG. 4 is another exploded perspective view of the connector assembly in FIG. 1.
Figure 4A:
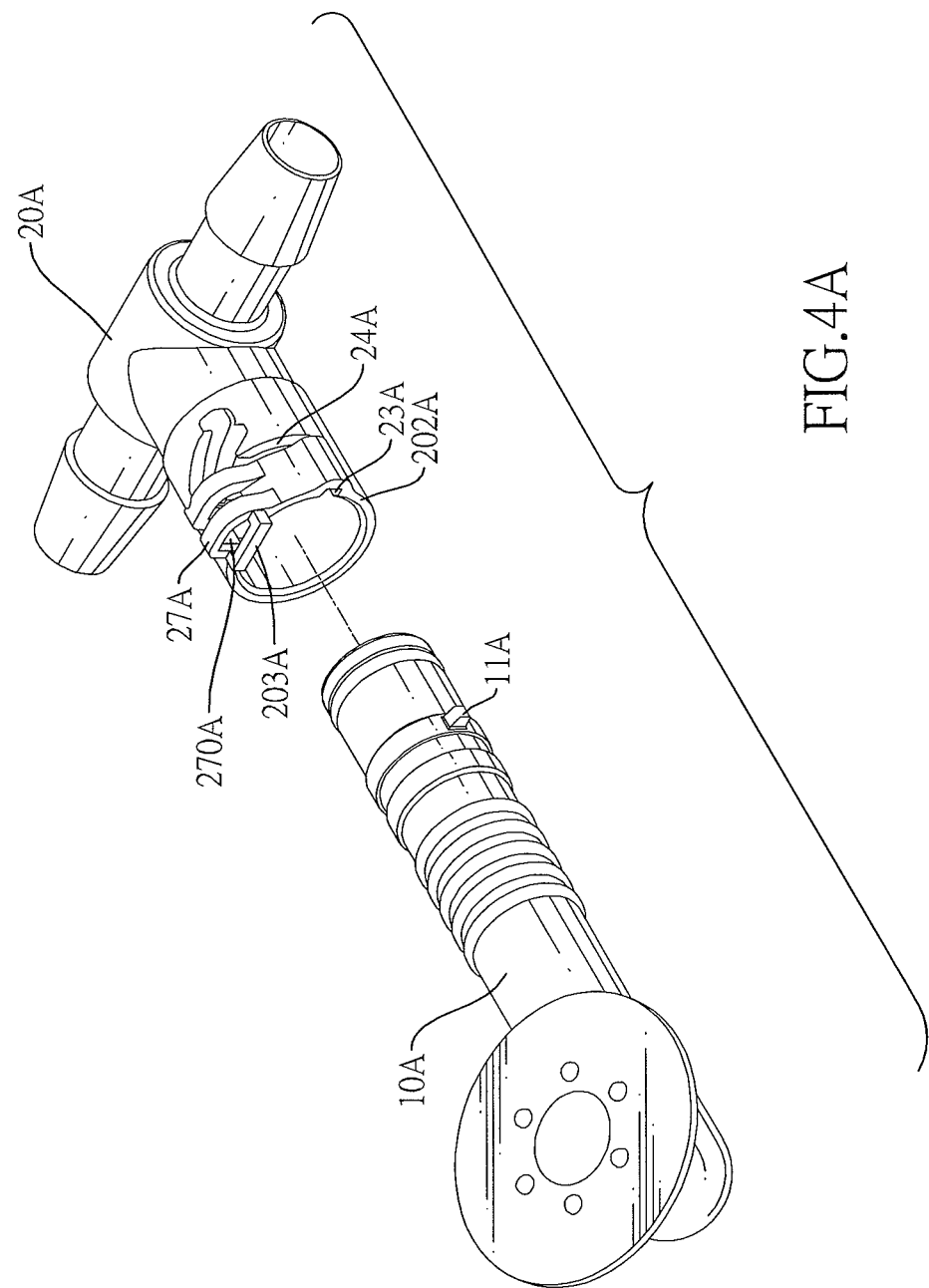
FIG. 4A is an exploded perspective view of a second embodiment of a connector assembly in accordance with the present invention.

With reference to FIG. 4A, the second connector 20A may further have a stopping block 203A longitudinally formed on and protruding from the connecting end 202A of the second connector 20A, corresponding to the escaping segment 27A and blocking the escaping space in the escaping segment 27A.

In the combination of the connector assembly in the first embodiment, with reference to FIGS. 6 to 11, the connecting ends 102,202 of the first and second connectors 10,20 are aligned with and moved toward each other to enter the engaging block 11 and the auxiliary engaging block 110 respectively into the entrance grooves 23,230 as shown in FIG. 6.

Figure 7:
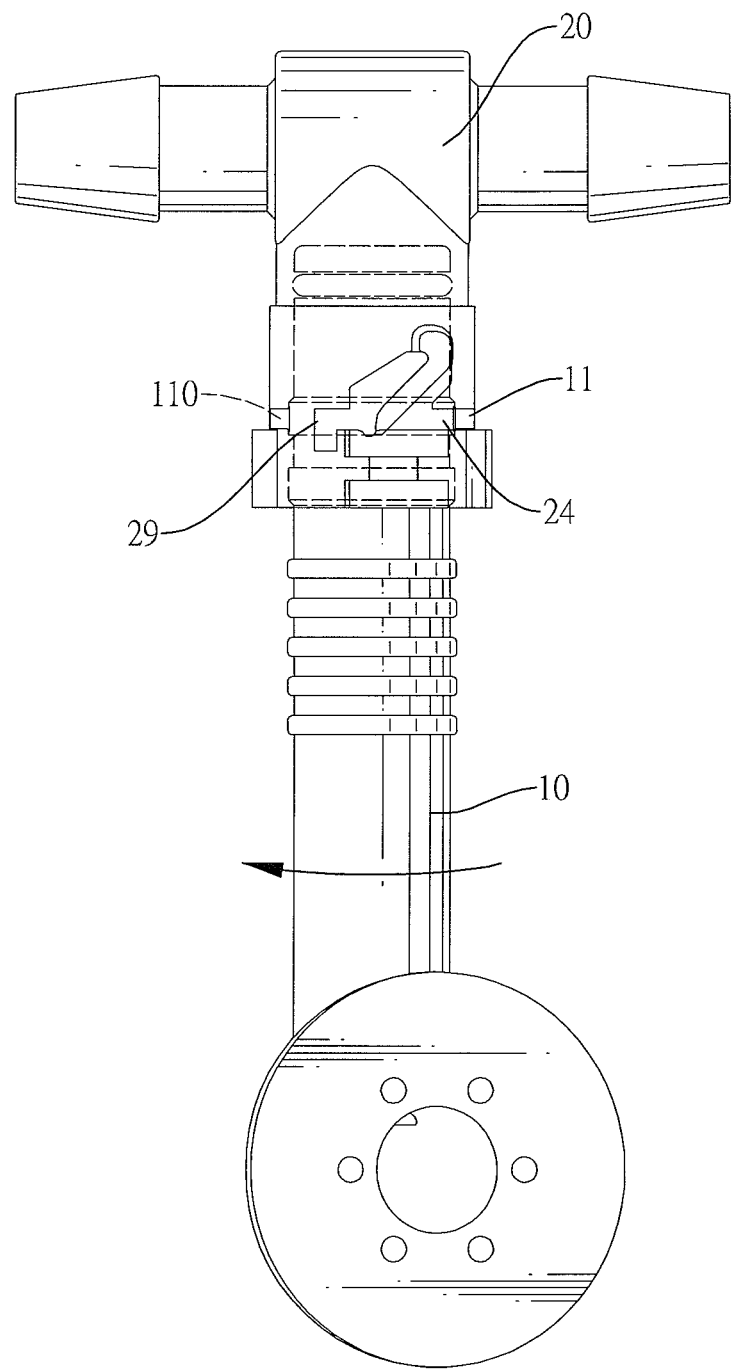

When the engaging block 11,110 are moved to positions where the conjunctions between the entrance grooves 23,230 and the guiding grooves 24,240, the first connector 10 is rotated to slide the engaging blocks 11,110 into the guiding grooves 24,240 as shown in FIG. 7.

Figure 8:
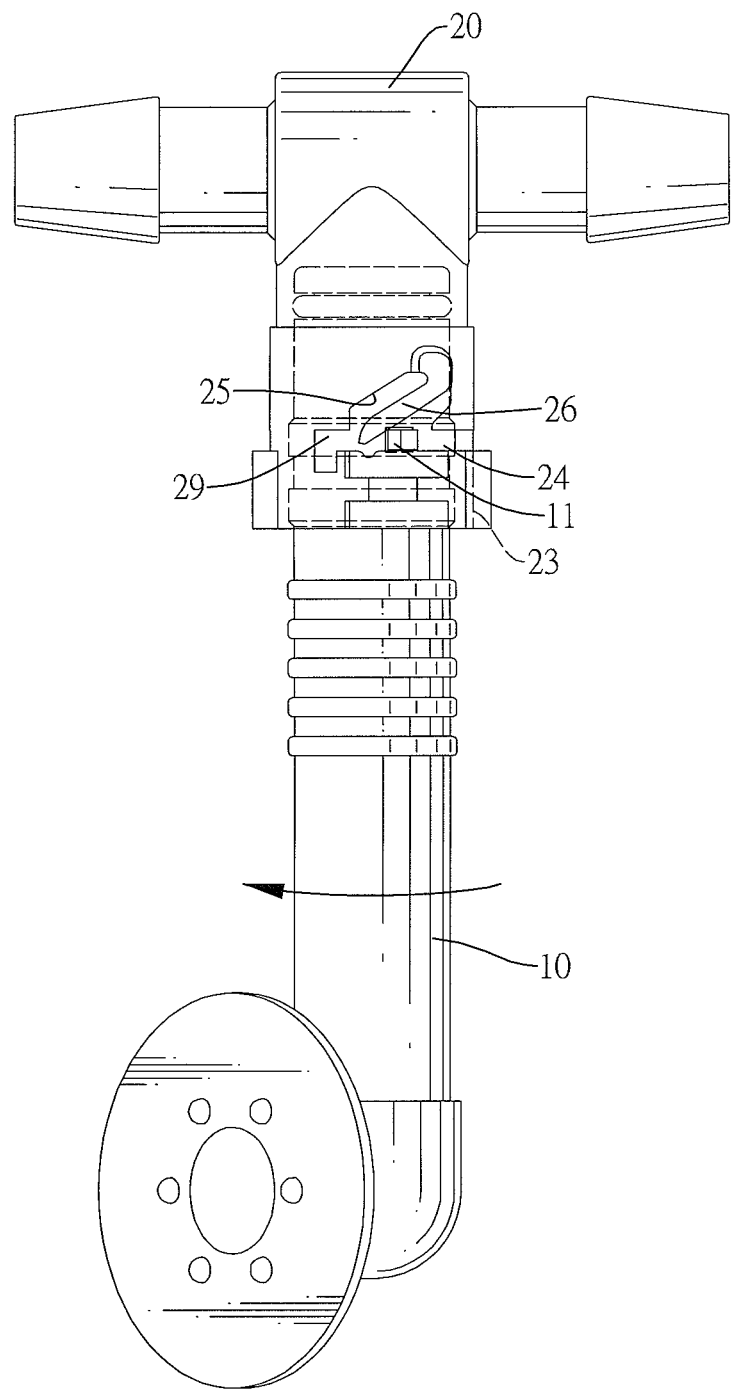
Figure 9:
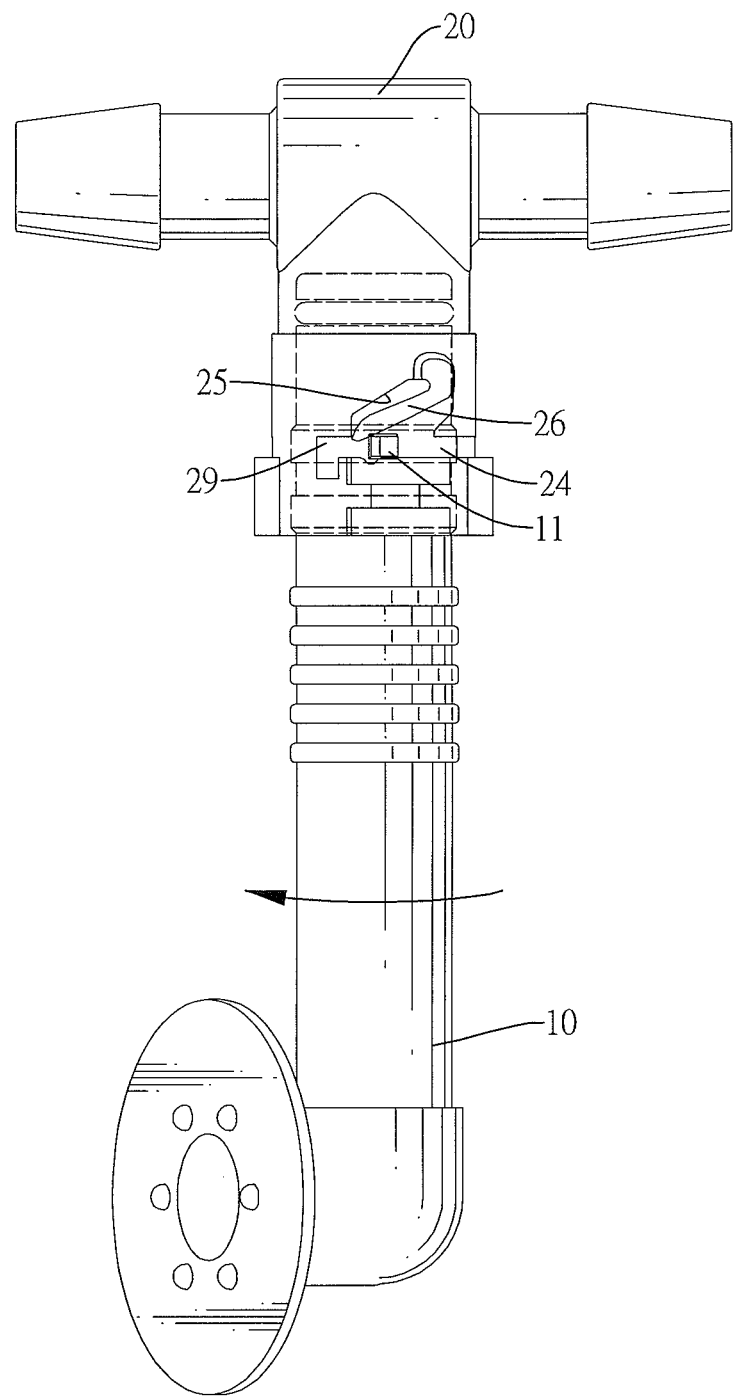

When the first connector 10 is rotated to abut the engaging block 11 with the resilient tab 26, the resilient tab 26 will be pushed against by the engaging block 11 to move away from the guiding groove 24, and the engaging block 11 can pass over the resilient tab 26 while the first connector 10 is kept rotating as shown in FIGS. 8 and 9.

Figure 10:
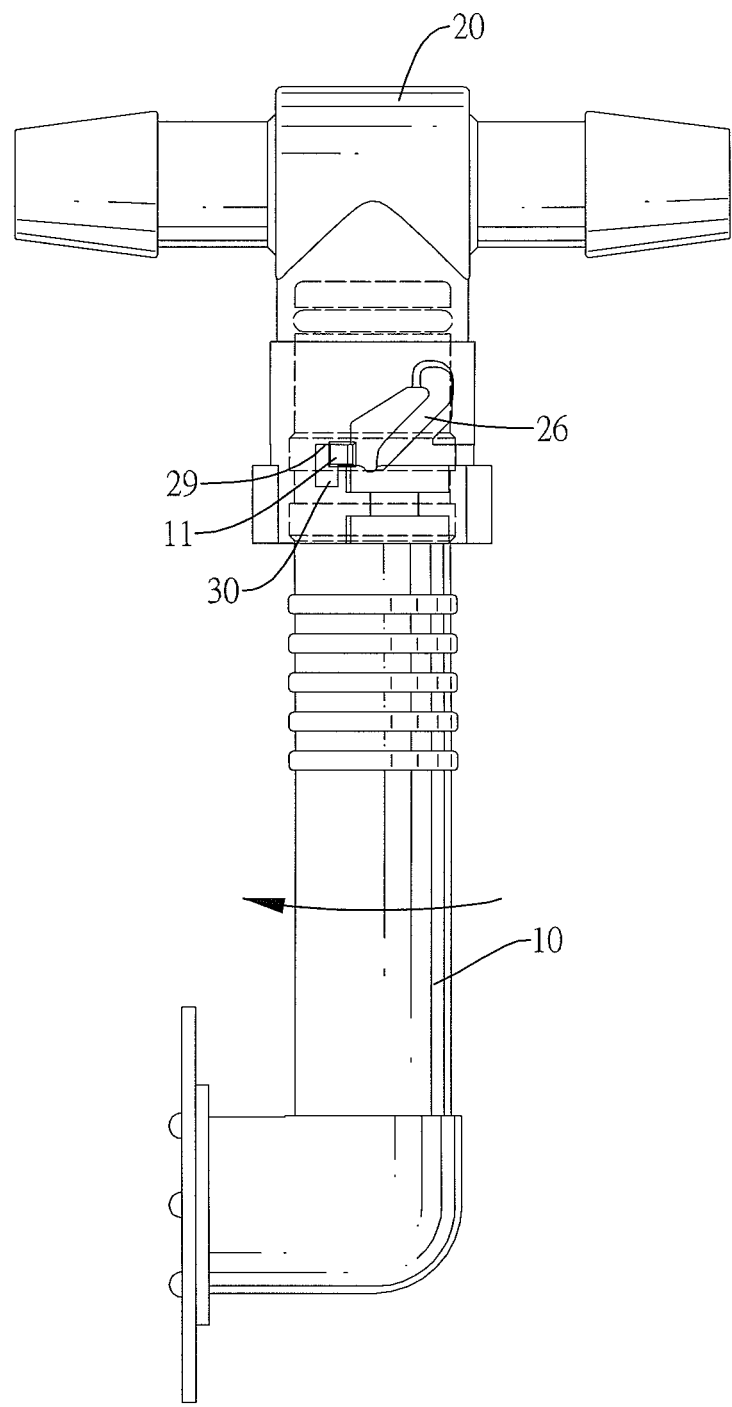

After the engaging block 11 passes over the resilient tab 26 and enters into the securing segment 29 of the guiding groove 24, the free end of the resilient tab 26 will rebound into the guiding groove 24 as shown in FIG. 10.

Figure 11:
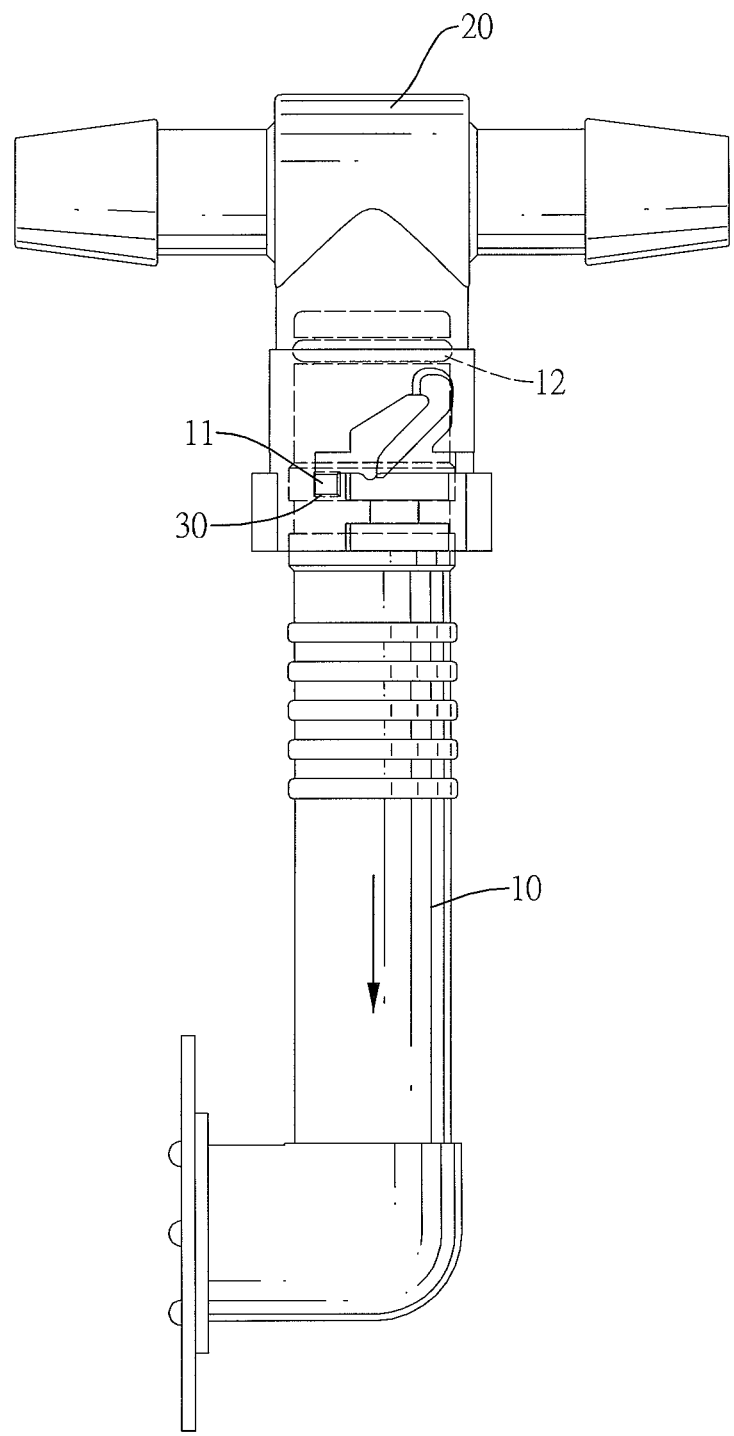

When the engaging blocks 11,110 align respectively with the positioning recesses 30,300 in the guiding grooves 24,240, the first connector 10 is pulled away from the second connector 20 to engage the engaging blocks 11,110 respectively with the positioning recesses 30,300 as shown in FIG. 11. Accordingly, the first and second connectors 10,20 can be combined securely with each other and can be kept from detaching from each other unintentionally. In addition, when the first connector 10 is connected with the second connector 20, the O-ring 12 abuts against the inner surface of the second connector 20. With the abutment between the O-ring 12 and the inner surface of the second connector 20, an excellent sealing effect is provided to keep the pressured air from leaking.

Figure 12:
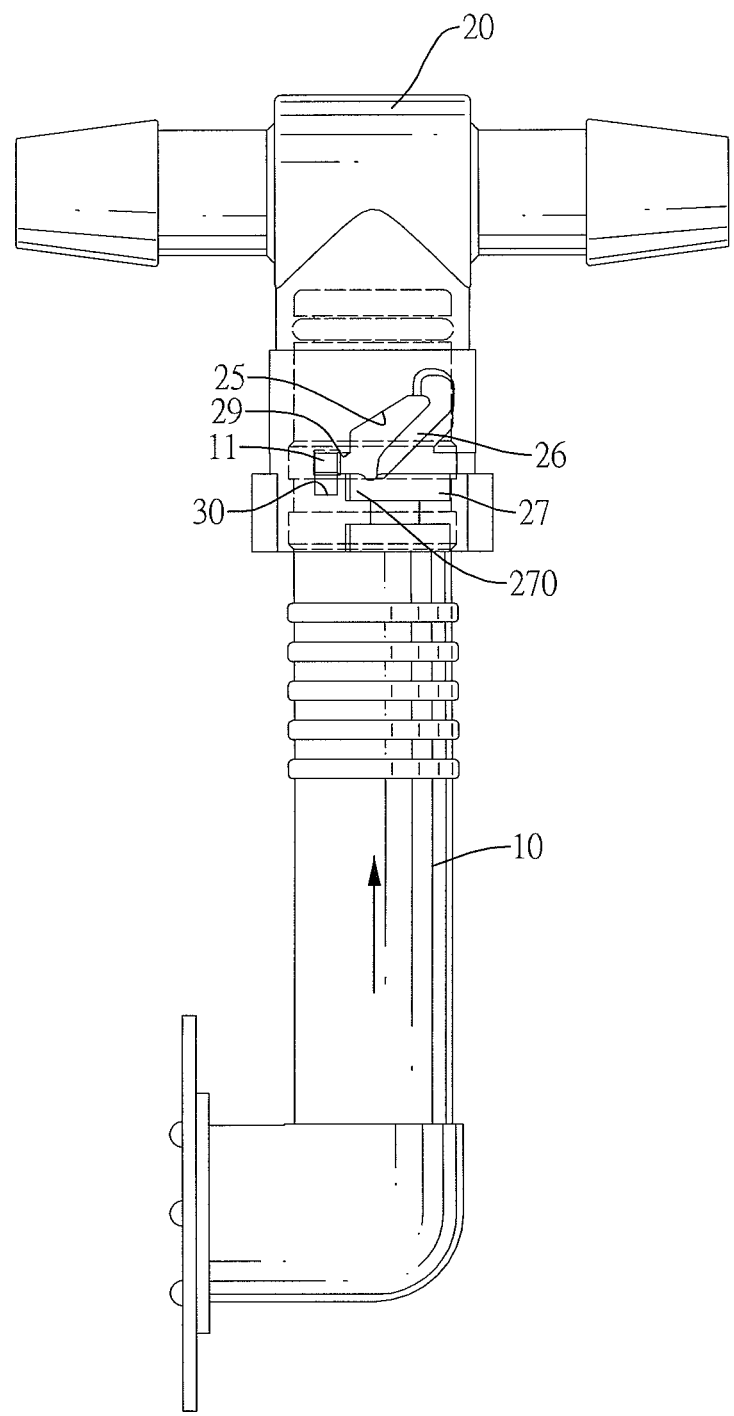
FIGS. 12 to 17 are operational side views of the connector assembly in FIG. 1 showing the detaching process of the first and second connectors.
Figure 13:
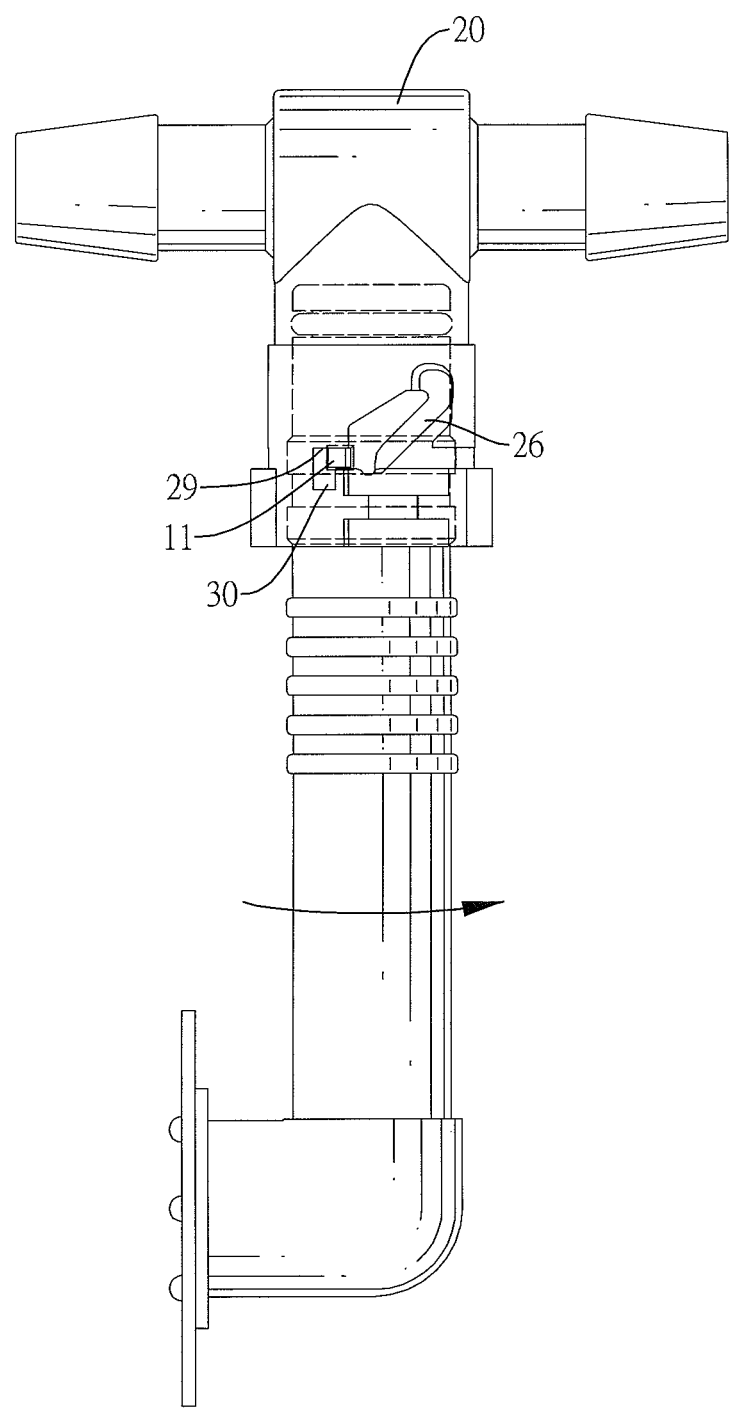
Figure 14:
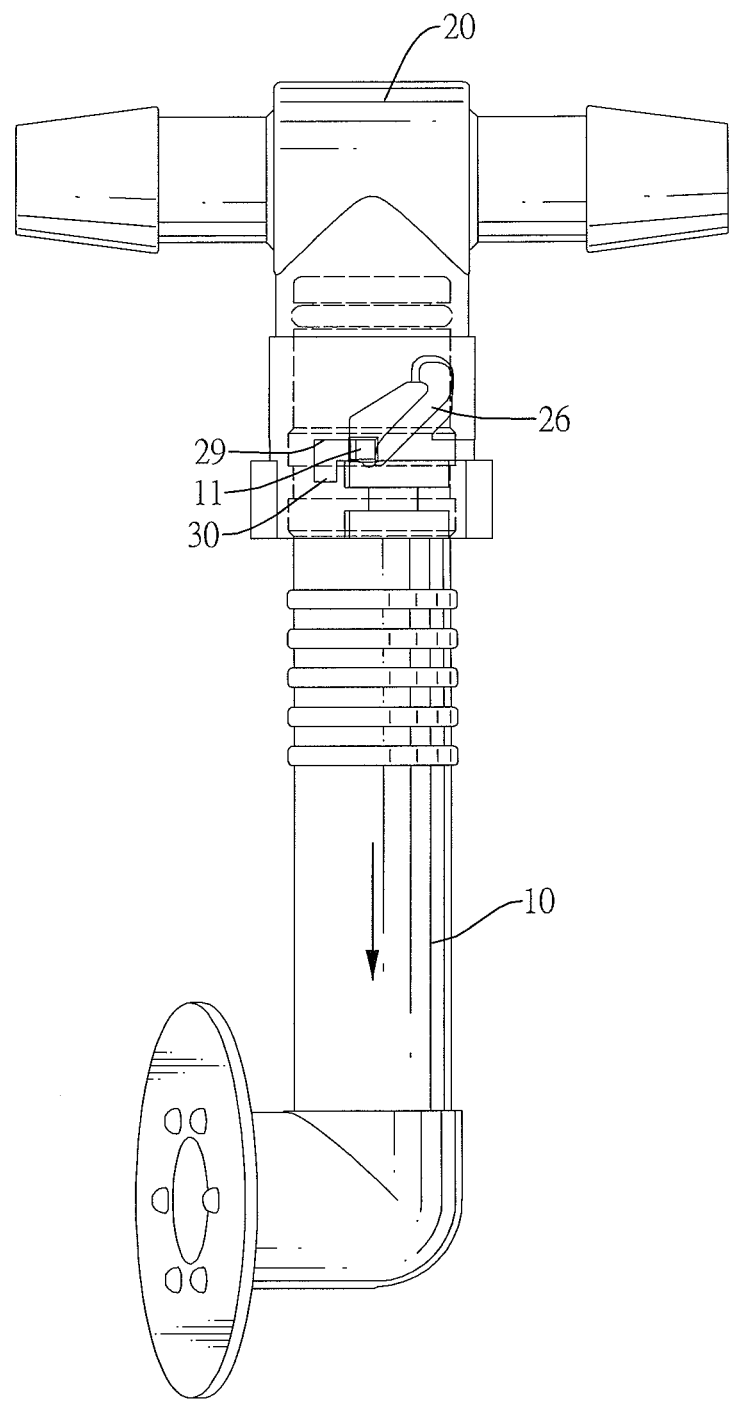

To disassemble the connectors 10,20, with reference to FIGS. 12 to 17, the first connector 10 is pushed toward the second connector 20 to disengage the engaging blocks 11,110 from the positioning recesses 30,300 as shown in FIG. 12. Then, the first connector 10 is rotated in reverse to slide the engaging blocks 11,110 along the guiding grooves 24,240 as shown in FIGS. 13 and 14.

Figure 15:
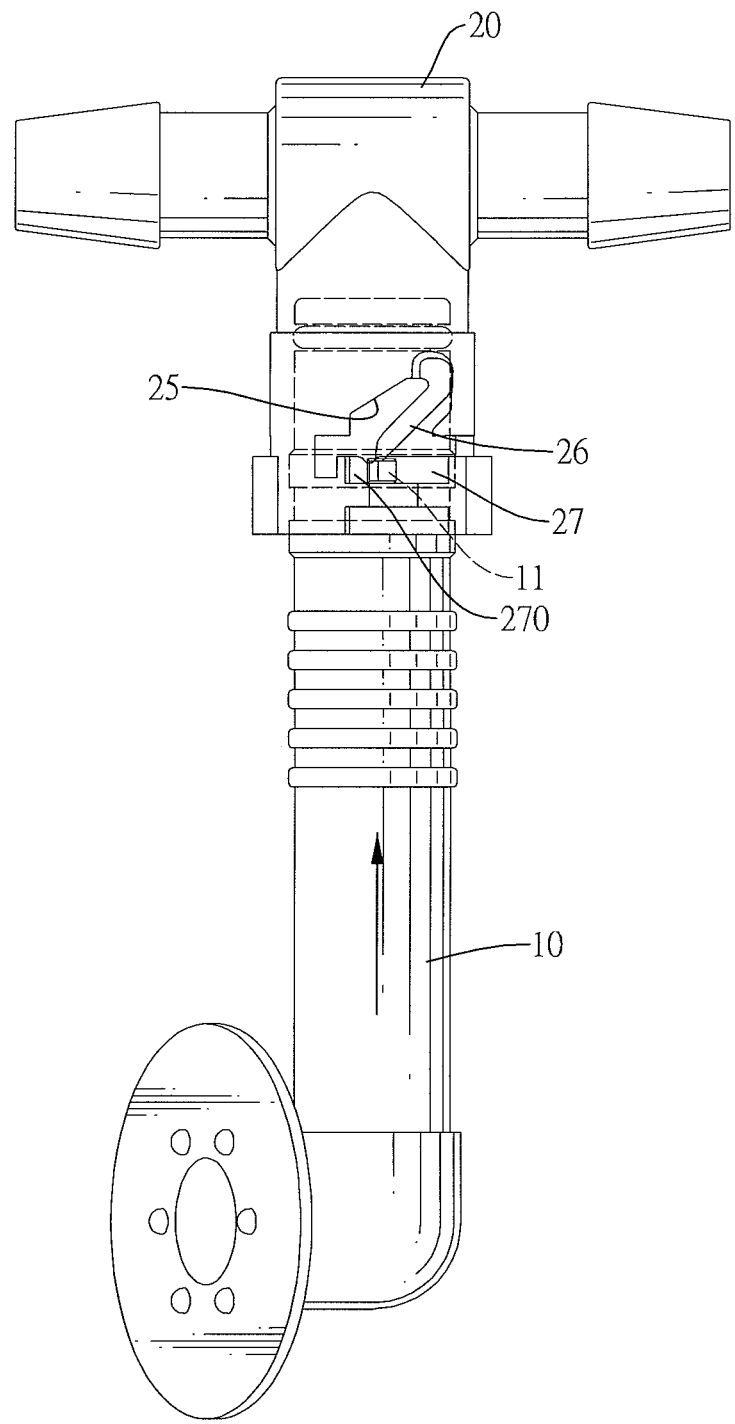

When the engaging block 11 abuts with the resilient tab 26, the first connector 10 cannot be further rotated due to the blocking effect provided by the resilient tab 26 to the engaging block 11. Then, the first connector 10 is pulled away from the second connector 20 to move the engaging blocks 11,110 toward the connecting end 202 of the second connector 20 and respectively enter into the escaping spaces 270,28 in the escaping segments 27 as shown in FIG. 15. Consequently, the first connector 10 can be further rotated with the engaging blocks 11,110 moving inside the escaping spaces 270,28 to pass the engaging block 11 over the free end of the resilient tab 26.

Figure 16:
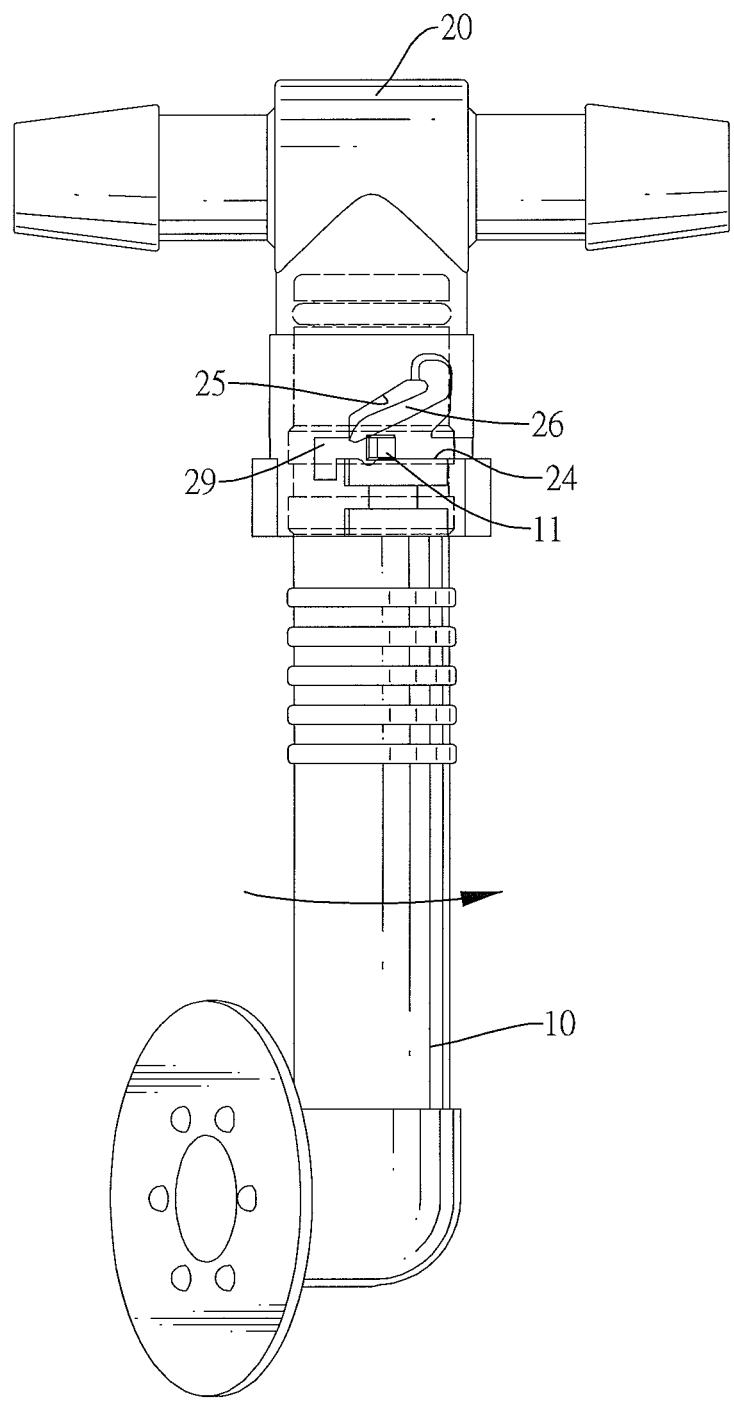

After the engaging block 11 passes over the free end of the resilient tab 26, the first connector 10 is pushed toward the second connector 20 to enter the engaging blocks 11,110 into the guiding grooves 24,240, and the first connector 10 is further rotated as shown in FIG. 16.

Figure 17:
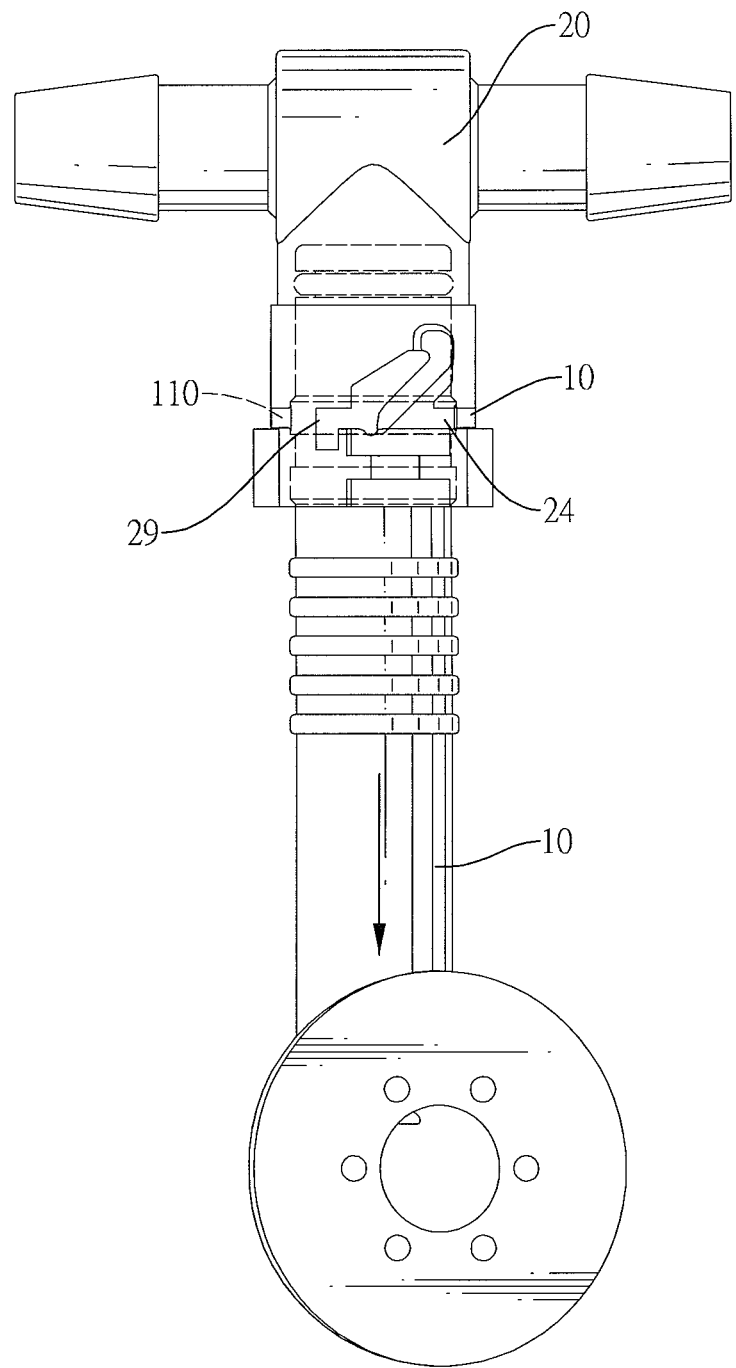

When the first connector 10 is rotated to a position where the engaging blocks 11,110 are moved to the conjunctions between the entrance grooves 23,230 and the guiding grooves 24,240, the first connector 10 is pulled away from the second connector 20 to slide the engaging blocks 11,110 out of the entrance grooves 23,230 as shown in FIG. 17. Accordingly, the first connector 10 is detached from the second connector 20.

With reference to FIG. 4A, in the second embodiment, the first connector 10A has only a single engaging block 11A, and the second connector 20A has only a single entrance groove 23A and a single guiding groove 24A. The operation of the second embodiment is substantially the same as that of the first embodiment, and a detail description is omitted. In addition, the stopping block 203A can prevent the engaging block 11A from escaping directly from the escaping space 270A in the escaping segment 27A when the first connector 10A is pulled away from the second connector 20A as shown in FIG. 14.

Figure 4B:
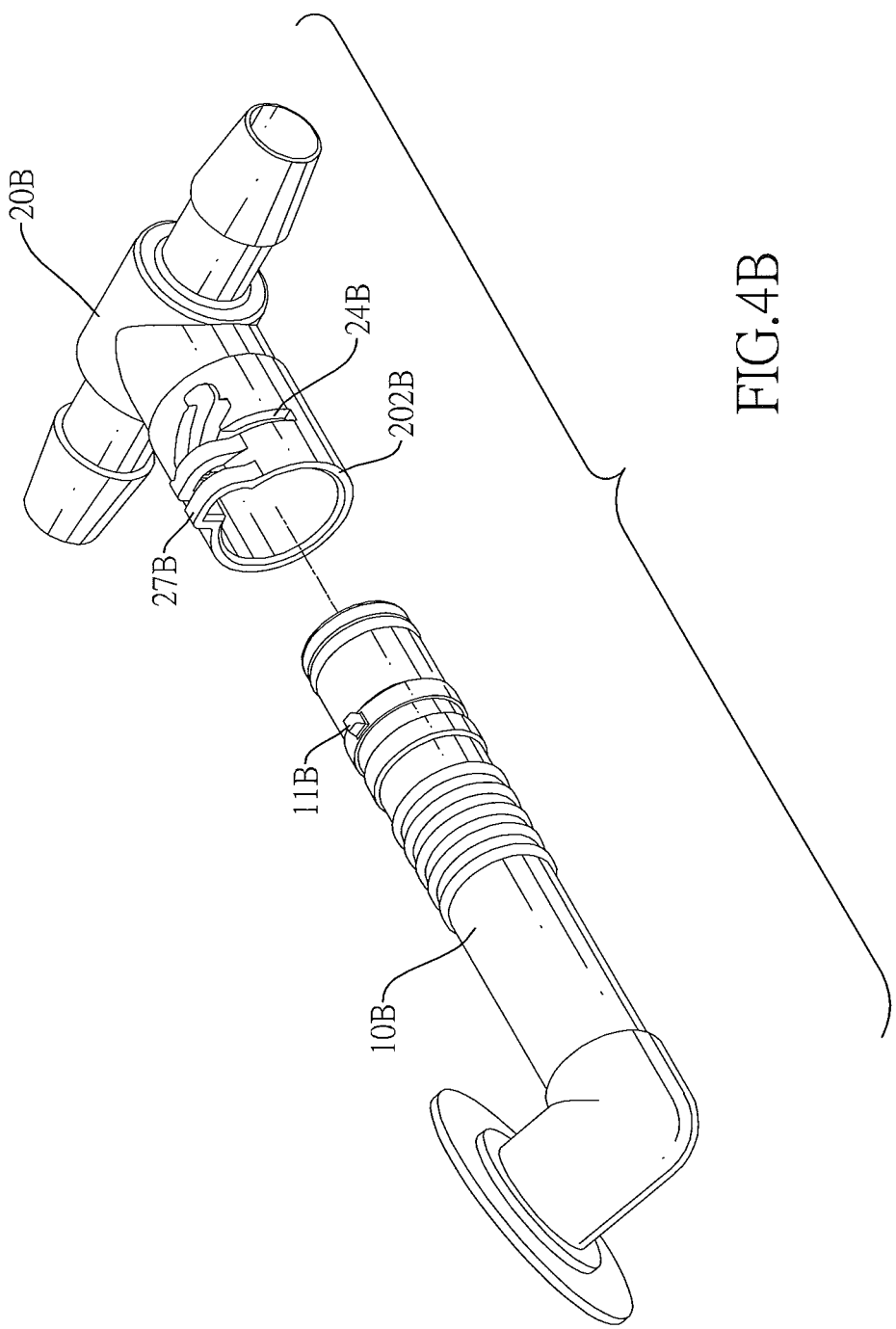
FIG. 4B is an exploded perspective view of a third embodiment of a connector assembly in accordance with the present invention.
Figure 5:
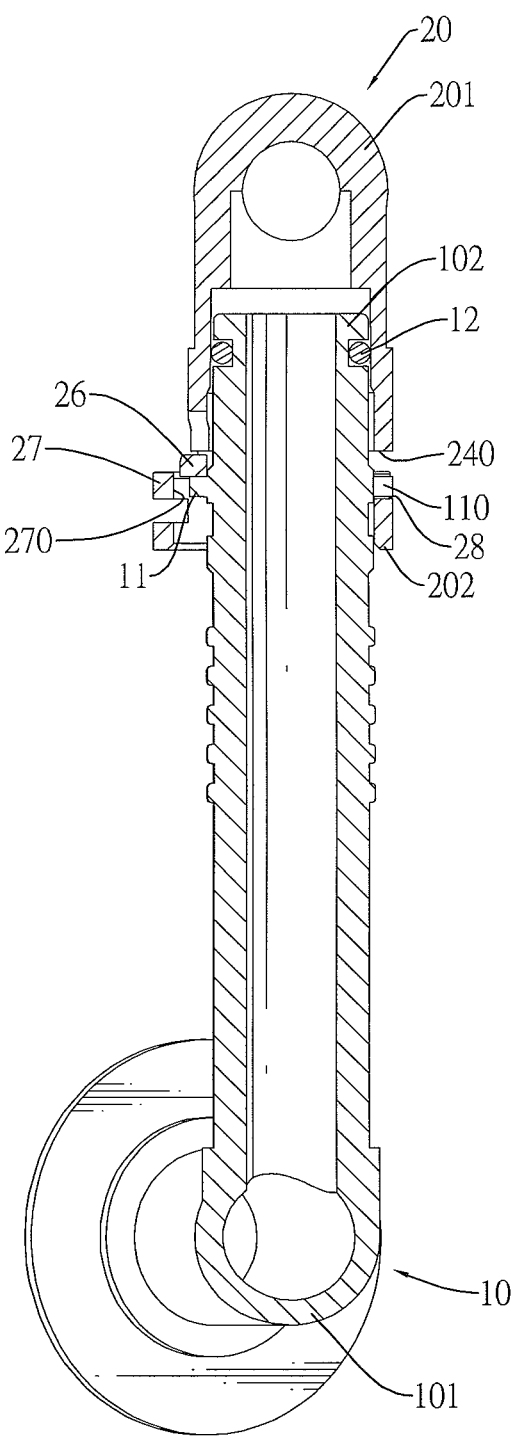
FIG. 5 is a cross sectional side view of the connector assembly in FIG. 1.

With reference to FIG. 4B, in the third embodiment, the first connector 10B has only a single engaging block 11B, and the second connector 20B has only a single guiding groove 24B spaced from the connecting end 202B but does not have any entrance groove.

Figure 18:
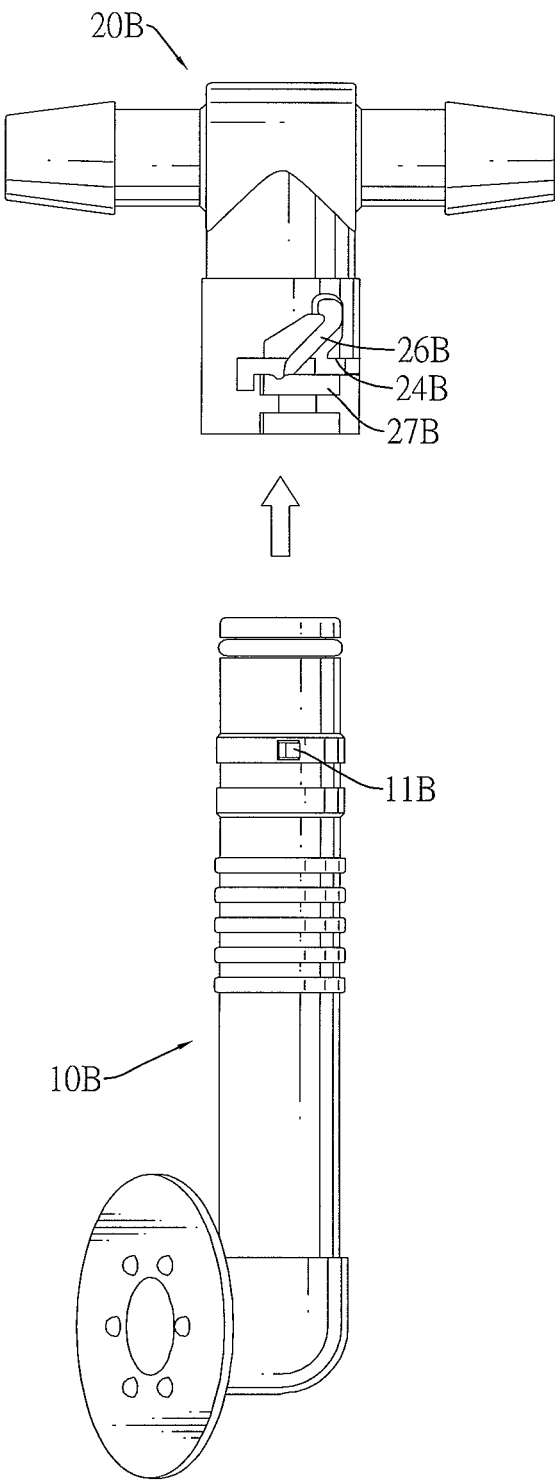
FIGS. 18 and 19 are operational side views of the connector assembly in FIG. 4B showing the combining process of the first and second connectors of the third embodiment of the connector assembly.

To combine the connectors 10B,20B in the third embodiment, with reference to FIG. 18, the engaging block 11B is aligned with and enters into the escaping space 270B in the escaping segment 27B. When the engaging block 11B abuts against the resilient tab 26B with the first connector 10B being pushed toward the second connector 20B, the resilient tab 26B will be pushed away from the guiding groove 24B by the engaging block 11B to allow the engaging block 11B entering into the guiding groove 24B. Consequently, the first connector 10B is rotated to align the engaging block 11B with and engage the positioning recess with the first connector 10B being pulled away from the second connector 20B.

Figure 19:
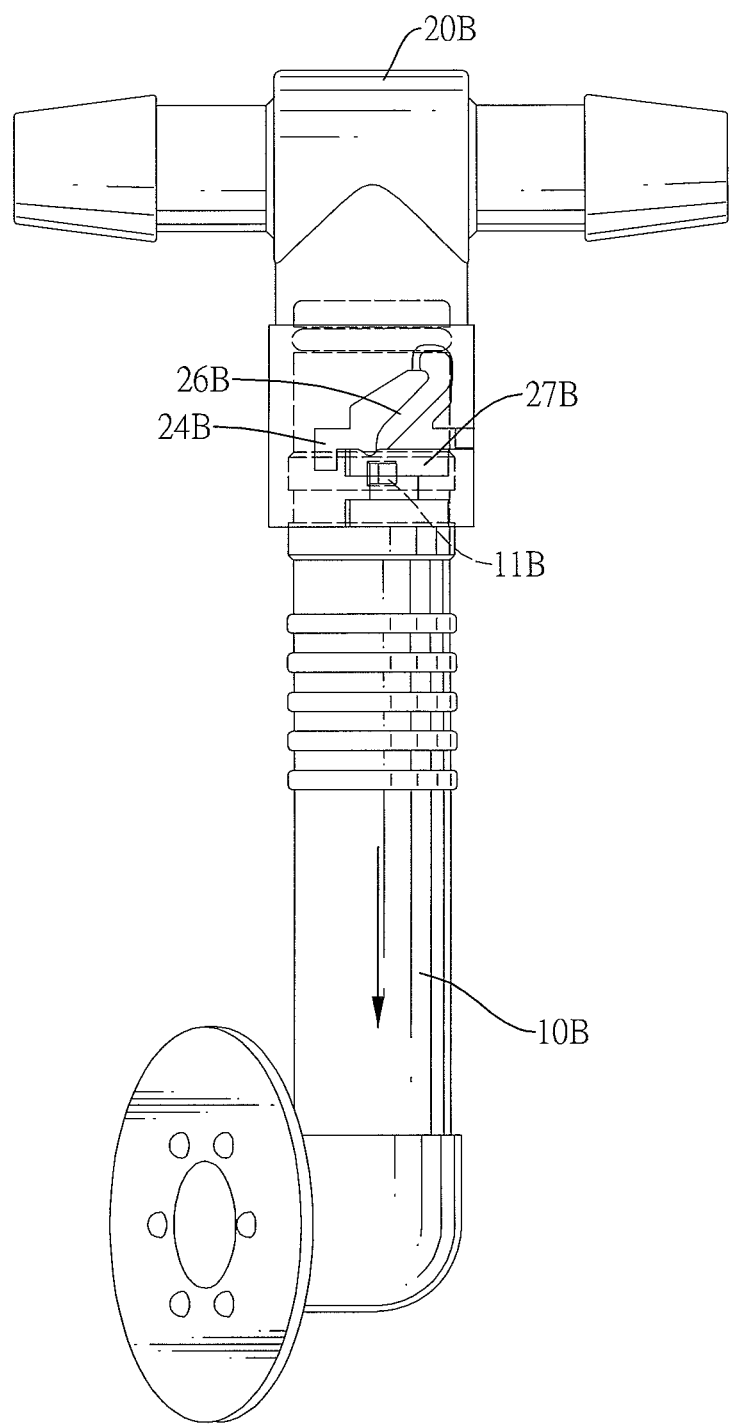

To disassemble the connectors 10B,20B, with reference to FIG. 19, the engaging block 11B is disengaged from the positioning recess and the first connector 10B is then rotated in reverse. When the engaging block 11B abuts with the resilient tab 26B, the first connector 10B is pulled away from the second connector 20B to enter the engaging block 11B into the escaping space 270B in the escaping segment 27B. Accordingly, the engaging block 11B can disengage from the second connector 20B directly via the escaping space 270B to detach the first connector 10B from the second connector 20B.

Because the connector assembly in accordance with the present invention has only two elements and the resilient tab 26 is integrally formed on the second connector 20, the number of elements of the connector assembly is reduced such that the cost for manufacturing the connector assembly can be efficiently reduced. In addition, with the symmetric arrangement of the engaging blocks 11,110 on the first connector 10 and the grooves 23,230,24,240 in the second connector 20, the combination between the connectors 10,20 is not limited to a specific direction, so to assemble the connector assembly is easy and convenient.

Furthermore, the first connector 10 and/or the second connector 20 can be made of high frequency material, such as Polyvinylchloride (PVC) or Polyurethane (PU) with a mold injection process. In use, the outer end of one of the first and second connectors 10,20 is mounted securely in an inflatable object with a high frequency process.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connector assembly comprising:
    a hollow first connector having
        an opened connecting end; and
        an engaging block formed on an outer surface of the first connector near the connecting end;
    a hollow second connector detachably connected with the first connector and having
        an opened connecting end corresponding to the connecting end of the first connector;
        a guiding groove defined in the second connector;
        a resilient tab cavity defined in the second connector at a side of the guiding groove opposite to the connecting end of the second connector and communicating with the guiding groove; and
        an escaping segment formed on and protruding from an outer surface of the second connector at a position between the guiding groove and the connecting end of the second connector and being hollow to define an escaping space in the escaping segment and communicating with the guiding groove; and
        a resilient tab formed on and protruding from an inner surface of the resilient tab cavity and having a free end extending into the guiding groove, wherein the second connector further has
    an entrance groove longitudinally defined in an inner surface from the connecting end of the second connector and communicating with the guiding groove; and
    a stopping block longitudinally formed on and protruding from the connecting end of the second connector, corresponding to the escaping segment and blocking the escaping space in the escaping segment.

2. The connector assembly as claimed in claim 1, wherein the guiding groove further has a positioning recess defined in one end of the guiding groove.

3. The connector assembly as claimed in claim 1, wherein the guiding groove further has a positioning recess defined in one end of the guiding groove opposite to the entrance groove and extending toward the connecting end of the second connector.

4. The connector assembly as claimed in claim 3, wherein the first connector further comprises an O-ring mounted around the connecting end of the first connector and abutting against the inner surface of the second connector.

5. The connector assembly as claimed in claim 1, wherein the first connector further comprises an O-ring mounted around the connecting end of the first connector and abutting against an inner surface of the second connector.

6. The connector assembly as claimed in claim 1, wherein the first connector is made of polyvinylchloride or polyurethane.

7. The connector assembly as claimed in claim 6, wherein the second connector is made of polyvinylchloride or polyurethane.

8. The connector assembly as claimed in claim 1, wherein the second connector is made of polyvinylchloride or polyurethane.

9. A connector assembly comprising:
    a hollow first connector having
        an opened connecting end; and
        an engaging block formed on an outer surface of the first connector near the connecting end;
    a hollow second connector detachably connected with the first connector and having
        an opened connecting end corresponding to the connecting end of the first connector;
        a guiding groove defined in the second connector;
        a resilient tab cavity defined in the second connector at a side of the guiding groove opposite to the connecting end of the second connector and communicating with the guiding groove; and
        an escaping segment formed on and protruding from an outer surface of the second connector at a position between the guiding groove and the connecting end of the second connector and being hollow to define an escaping space in the escaping segment and communicating with the guiding groove; and
        a resilient tab formed on and protruding from an inner surface of the resilient tab cavity and having a free end extending into the guiding groove, wherein the second connector further has
    an auxiliary guiding groove defined in the second connector and being diametrically opposite to the guiding groove;
    an auxiliary escaping segment formed on and protruding from the outer surface of the second connector, being diametrically opposite to the escaping segment and being hollow to define an auxiliary escaping space in the auxiliary escaping segment and communicating with the auxiliary guiding groove; and two entrance grooves longitudinally defined in an inner surface from the connecting end of the second connector, being diametrically opposite to each other and respectively communicating with the guiding groove and the auxiliary guiding groove;

wherein the first connector further has an auxiliary engaging block formed on the outer surface of the first connector and diametrically opposite to the engaging block, and wherein the engaging block and the auxiliary engaging block respectively correspond to the entrance grooves in the second connector.

10. The connector assembly as claimed in claim 9, wherein each one of the guiding groove and the auxiliary guiding groove further has a positioning recess defined in one end of the guiding groove and the auxiliary guiding groove opposite to a corresponding entrance groove and extending toward the connecting end of the second connector.

11. The connector assembly as claimed in claim 10, wherein the first connector further comprises an O-ring mounted around the connecting end of the first connector and abutting against the inner surface of the second connector.

12. The connector assembly as claimed in claim 9, wherein the first connector further comprises an O-ring mounted around the connecting end of the first connector and abutting against the inner surface of the second connector.

13. The connector assembly as claimed in claim 9, wherein the first connector is made of polyvinylchloride or polyurethane.

14. The connector assembly as claimed in claim 9, wherein the second connector is made of polyvinylchloride or polyurethane.

15. A connector assembly comprising:
a hollow first connector having
an opened connecting end; and
an engaging block formed on an outer surface of the first connector near the connecting end;
a hollow second connector detachably connected with the first connector and having
an opened connecting end corresponding to the connecting end of the first connector;
a guiding groove defined in the second connector;
a resilient tab cavity defined in the second connector at a side of the guiding groove opposite to the connecting end of the second connector and communicating with the guiding groove; and
an escaping segment formed on and protruding from an outer surface of the second connector at a position between the guiding groove and the connecting end of the second connector and being hollow to define an escaping space in the escaping segment and communicating with the guiding groove; and
a resilient tab formed on and protruding from an inner surface of the resilient tab cavity and having a free end extending into the guiding groove, wherein the guiding groove further has a positioning recess defined in one end of the guiding groove; and wherein the first connector further comprises an O-ring mounted around the connecting end of the first connector and abutting against an inner surface of the second connector.

* * * * *